(12) United States Patent
Sutardja et al.

(10) Patent No.: US 6,711,225 B1
(45) Date of Patent: Mar. 23, 2004

(54) METHOD AND APPARATUS FOR SYNCHRONIZATION OF A BIT STREAM FOR LONG LATENCY DATA DETECTION

(75) Inventors: Pantas Sutardja, San Jose, CA (US); Andrei Vityaev, Santa Clara, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

(21) Appl. No.: 09/578,886

(22) Filed: May 26, 2000

(51) Int. Cl.$^7$ ................................ H04L 7/06
(52) U.S. Cl. .................. 375/364; 375/366; 370/509; 370/514
(58) Field of Search .................. 375/354, 357, 375/364–366; 370/503, 509, 510, 511, 513, 514; 714/701, 707, 775, 789

(56) References Cited

U.S. PATENT DOCUMENTS

| | | | | | |
|---|---|---|---|---|---|
| 5,109,385 A | * | 4/1992 | Karp et al. | ............ | 360/48 |
| 5,604,723 A | * | 2/1997 | Kikuta | ............ | 369/47.32 |
| 5,623,474 A | * | 4/1997 | Oshio et al. | ............ | 360/27 |
| 5,796,690 A | | 8/1998 | Kanno | ............ | 369/48 |
| 5,844,920 A | * | 12/1998 | Zook et al. | ............ | 360/51 |
| 6,009,549 A | | 12/1999 | Bliss et al. | ............ | 714/769 |
| 6,097,561 A | * | 8/2000 | Wakefield et al. | ............ | 360/51 |
| 6,108,152 A | * | 8/2000 | Du et al. | ............ | 360/40 |
| 6,191,902 B1 | * | 2/2001 | Hashimura et al. | ............ | 360/46 |

OTHER PUBLICATIONS

Souvignier et al., "Turbo Decoding for Partial Response Channels with Media Noise", Global Telecommunications Conference–Globecom '99, pp. 739–743.

* cited by examiner

Primary Examiner—Stephen Chin
Assistant Examiner—Dac V. Ha

(57) ABSTRACT

A method and apparatus for data retrieval from a storage media, such as magnetic disk drive. A synchronization detector decodes the synchronization information from either the first or second synchronization mark. A later stage detector then carries out several decoding iterations using the synchronization information from the synchronization detector and data stored in the first and second memories. Loss of the data between the first synchronization mark and the second synchronization mark, if there is a problem with the first synchronization mark, is avoided because the bit stream is stored in the first memory.

12 Claims, 4 Drawing Sheets

METHOD AND APPARATUS FOR SYNCHRONIZATION OF A BIT STREAM FOR LONG LATENCY DATA DETECTION

BACKGROUND OF THE INVENTION (1) Field of the Invention

This invention relates to apparatus and methods for decoding a bit stream using synchronization information contained in two synchronization marks embedded in the bit stream and more particularly to the capability of using the synchronization information in either of the synchronization marks.

(2) Description of the Related Art

When data is retrieved from a storage media the beginning and end of the data stream must be correctly determined. This is accomplished using synchronization data contained in two synchronization marks. If the separation between the first and second synchronization marks is large there is a possibility that large amounts of data can be lost if there is a failure in decoding the first synchronization mark.

U.S. Pat. No. 5,796,690 to Kanno describes a disc controller with improved data sync and re-sync mark detection. In response to sync and re-sync mark detection failure status signals, a re-sync mark detection window expands a timing window opening to improve the possibility of detection of the next re-sync mark.

U.S. Pat. No. 5,844,920 to Zook et al. describes a method for thermal asperity compensation using multiple sync marks for retroactive and split segment data synchronization in a magnetic disk storage system. In a magnetic disk storage system, byte synchronization to sector data is achieved even when noise in the read channel, due for instance to a thermal asperity (TA), corrupts the primary preamble and/or sync mark fields or causes a loss of frequency or phase lock. The data sector format is modified to comprise at least one secondary sync mark in addition to the conventional primary sync mark recorded at the beginning of the data field. In this manner, when the primary sync mark becomes undetectable due to errors, or when byte synchronization is lost, the storage system can still synchronize to the data sector using the secondary sync mark.

U.S. Pat. No. 6,009,549 to Bliss et al. describes a disk storage system employing error detection and correction of channel coded data, interpolated timing recovery, and retroactive and split-segment symbol synchronization. The disk storage system allows retroactive and split-segment symbol synchronization using multiple sync marks.

SUMMARY OF THE INVENTION

During the process of data retrieval from a storage media, such as magnetic disk drive, it is necessary to correctly determine the beginning and the end of the data stream. This is typically done by using synchronization information encoded in the special synchronization marks which are embedded in the data stream. FIG. 1 shows a schematic representation of the beginning of a data sector on a disk drive. The sector begins with a preamble pattern 100 which is required by the timing and gain recovery means of the data retrieval circuitry. Next the first synchronization mark 101 indicates the beginning of the encoded data bytes 102 and 104. The data bytes also contain the second synchronization mark 103, which is used to prevent failure of the data synchronization mechanism if the first synchronization mark is not detected due to problems such as media defects or high noise conditions. In the event the first synchronization mark 101 is not detected, the portion of the data 102 prior to the first synchronization mark 101 is lost since no synchronization information is available. However, the second portion 104 of the data is successfully retrieved since the second synchronization mark 103 provides synchronization information for the second portion 104 of the data.

FIG. 2 shows a schematic drawing of conventional data retrieval circuitry. The retrieved signal samples first enter the front end portion 200 where a variety of operations, such as filtering and timing recovery, are performed. The modified samples are then sent to a detector circuit 201 where the bit stream taken from the media is reconstructed using the samples. This bit stream is then sent to the rest of the data retrieval circuitry 203 and also fed to the synchronization detector 202. The synchronization information provided by the synchronization detector 202 decoding the synchronization mark is used to decode the bit stream. The disadvantage of the conventional data retrieval circuitry, shown in FIG. 2, is that failure in detecting the first synchronization mark, 101 in FIG. 1, results in the loss of the data, 102 in FIG. 1, prior to the second synchronization mark, 103 in FIG. 1.

It is a principle objective of this invention to provide a method of decoding a bit stream having two synchronization marks which avoids loss of data if the detection operation of one of the synchronization marks fails.

It is another principle objective of this invention to provide an apparatus for decoding a bit stream having two synchronization marks which avoids loss of data if the detection operation of one of the synchronization marks fails.

These objectives are achieved by feeding the bit stream into a front end circuit. The output of the front end circuit is fed to a first memory so that the entire bit stream is stored in the first memory. The output of the first memory is fed to a first stage detector. The first stage of detection does not require synchronization information. The output of the first stage detector is fed to a second memory and simultaneously to a synchronization detector. The synchronization detector decodes the synchronization information from either the first or second synchronization mark. Later stages of detection are then carried out using the synchronization information from the synchronization detector and the data stored in the first memory and second memory.

This method prevents the loss of data between the first and second synchronization marks in the event the first synchronization mark data is lost, since all the data from the bit stream are stored in first memory and can be accessed later using the synchronization information from the second synchronization mark.

DESCRIPTION OF THE PREFERRED EMBODIMENTS

Figure 1:
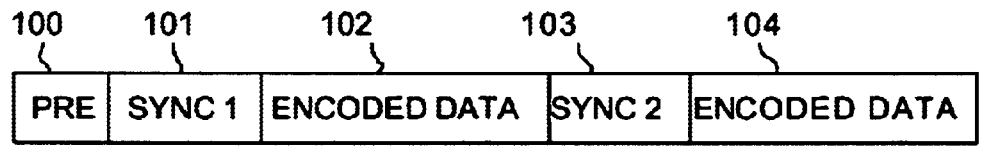
FIG. 1 shows a schematic representation of a bit stream having sequentially a preamble, a first synchronization mark, a first segment of encoded data, a second synchronization mark, and a second segment of encoded data.
Figure 2:
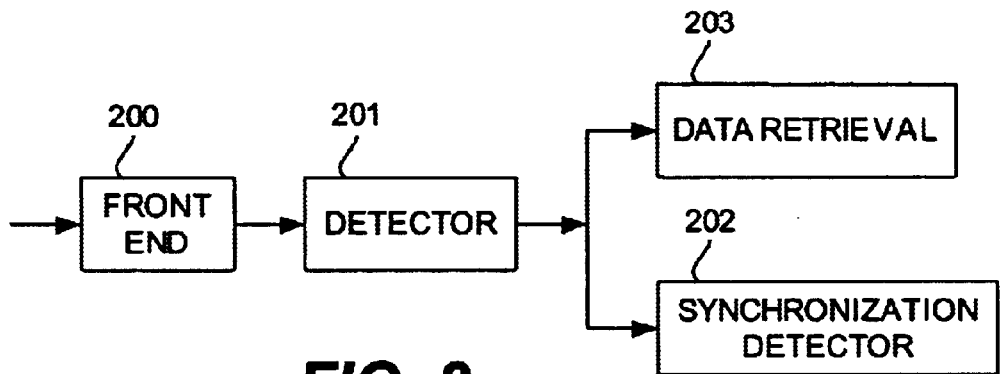
FIG. 2 shows a block diagram of a conventional circuit for decoding a bit stream from storage media.
Figure 3:
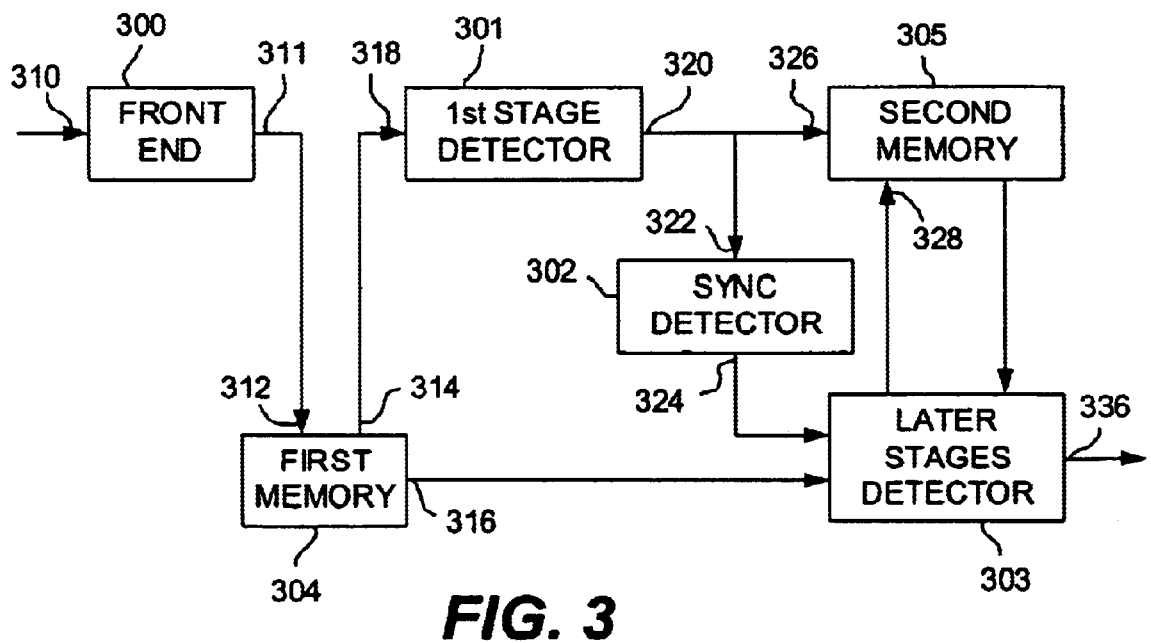
FIG. 3 shows a block diagram of the apparatus of this invention for decoding a bit stream from storage media.
Figure 4:
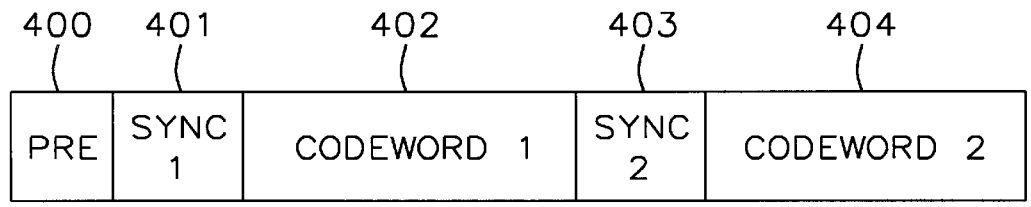
FIG. 4 shows a schematic representation of a bit stream having sequentially a preamble, a first synchronization mark, a first segment of encoded data, a second synchronization mark, and a second segment of encoded data.
Figure 5:
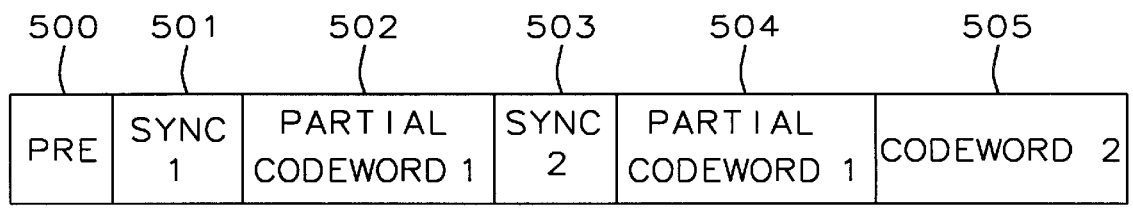
FIG. 5 shows a schematic representation of a bit stream having sequentially a preamble, a first synchronization mark, a first segment of encoded data, a second synchronization mark, a second segment of encoded data, and a third segment of encoded data.

Refer now to FIGS. 3–5 for a description of the preferred embodiments of this invention. FIG. 3 shows a block diagram of the data retrieval circuit of this invention for decoding a waveform from storage media. The circuit shown in FIG. 3 has a front end circuit 300, a first stage detector 301, a synchronization detector 302, a first memory 304, a second memory 305 and a later stages detector. A waveform, containing two synchronization marks, is read from a storage media, such as a magnetic disk, and fed to the input 310 of the front end circuit 300.

Before proceeding with the operation of the data retrieval circuit of FIG. 3 refer to FIGS. 4 and 5 for a description of possible bit stream configurations used when recording the data on the storage media. One possible configuration of the bit stream is shown in FIG. 4. The bit stream shown in FIG. 4 has a preamble pattern 400 which is required by the timing and gain recovery of the front end circuit, reference number 300 in FIG. 3. The preamble pattern 400 is followed by a first synchronization mark 401 containing synchronization information which signals the beginning of the encoded data. The first synchronization mark 401 is followed by a first codeword 402 containing part of the data to be retrieved. The first codeword 402 is followed by a second synchronization mark 403. The second synchronization mark 403 contains the same synchronization information as the first synchronization mark 401 to cover the event wherein the first synchronization mark 401 is lost due to problems such as media defects, high noise conditions, or the like. The second synchronization mark 403 is followed by a second codeword 404 containing the rest of the data to be retrieved.

Another possible configuration of the bit stream is shown in FIG. 5. The bit stream shown in FIG. 5 also has a preamble pattern 500 which is required by the timing and gain recovery of the data retrieval circuit. The preamble pattern 500 is followed by a first synchronization mark 501 containing synchronization information which signals the beginning of the encoded data. The first synchronization mark 501 is followed by a portion of the first codeword 502 containing part of the data to be retrieved. In this example the first codeword is divided by a second synchronization mark 503 into a first part 502 and a second part 504. The second synchronization mark 503 is in the middle of the first codeword, between the first parts 502 and the second part 504 of the first codeword. The second synchronization mark 503 contains the same synchronization information as the first synchronization mark 501 to cover the event wherein the first synchronization mark 501 is lost due to problems such as media defects, high noise conditions, or the like. The second part of the first codeword 504 is followed by a second codeword 505 containing more of the data to be retrieved.

In both of the bit streams described above the bit stream has a first and second synchronization mark and the first and second synchronization marks contain the same synchronization data. The data to be recovered is contained in the codewords, each of which is about 1000 bits or more in size.

Returning again to FIG. 3, a waveform containing a bit stream, such as that shown in either FIG. 4 or that shown in FIG. 5, is read from the storage media and fed to the input 310 of the front end circuit 300. The waveform has synchronization information encoded in two synchronization marks, wherein the synchronization information in each of the two synchronization marks is the same. In the front end circuit 300 a variety of operations are performed including gain and timing recovery, analog to digital conversion, and digital equalization. The front end circuit 300 then outputs a digitized sampled waveform containing the data. None of the operations in the front end circuit 300 require the synchronization information from either of the two synchronization marks, however this information will be used later. The digitized data representing the digitized sampled waveform is fed from the output 311 of the front end circuit 300 to the input 312 of the first memory 304 and is stored in the first memory 304. The data stored in the first memory 304 includes the data from the synchronization marks and the data to be retrieved contained in a number of codewords.

The data in the first memory 304 is fed from a first output 314 of the first memory 304 to the input 318 of a first stage detector 301. The first stage detector 301 decodes the bits from the digitized samples. The first stage detector 301 is a channel decoder in the sense that it decodes both the data and parity bits from the digitized sampled waveform. The first stage detector 301 does not require the synchronization information from either of the two synchronization marks to perform its function. The output 320 of the first stage detector 301 is fed to a first input 326 of a second memory 305 for storage as well as to the input 322 of a synchronization detector 302. The synchronization detector 302 extracts the synchronization information from either the first synchronization mark or the second synchronization mark so that the synchronization information is available at the output 324 of the synchronization detector 302 even if there is a problem with either the first synchronization mark or the second synchronization mark.

The synchronization information from the synchronization detector 302, the digitized sampled waveform stored in the first memory 304, and the data from the first stage detector 301 stored in the second memory 305 are then fed to a later stages detector 303. The data retrieval is completed in the later stages detector 303 and fed to the output 336. The information from either the first synchronization mark or the second synchronization mark is used in the later stages detector 303. The later stages detector 303 is also connected to a second input 328 of the second memory 305. The later stages detector 303 actually comprises a number of detectors which perform iterative decoding. The second memory 305 actually comprises a number of memories which stores the results of the operations of these detectors. The operation of the later stages detector 303 and the second memory 305 will be described in greater detail later.

Figure 7:
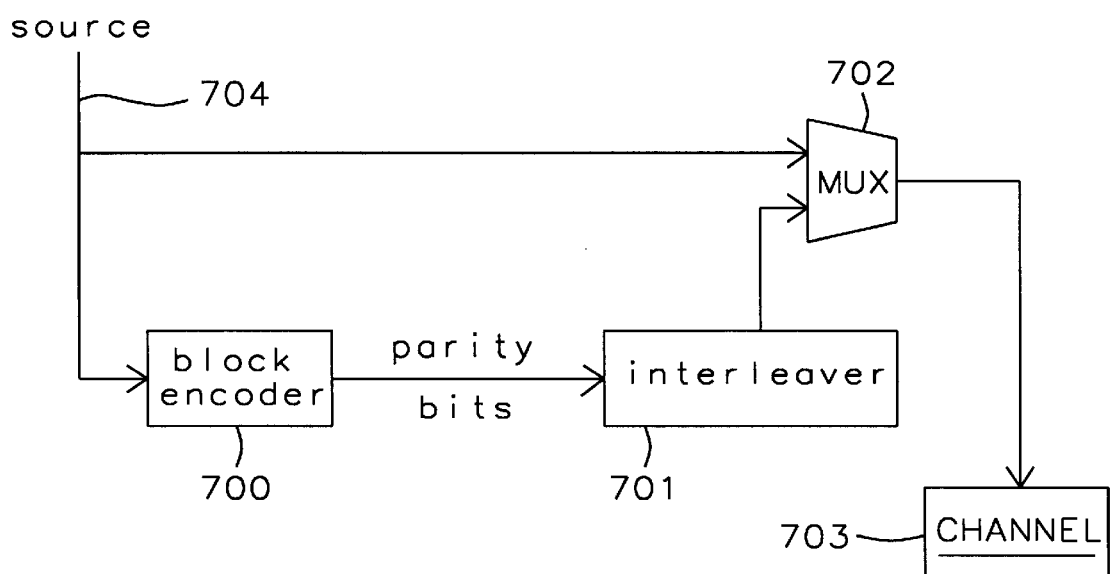
FIG. 7 shows a diagram of an encoding structure.
Figure 6:
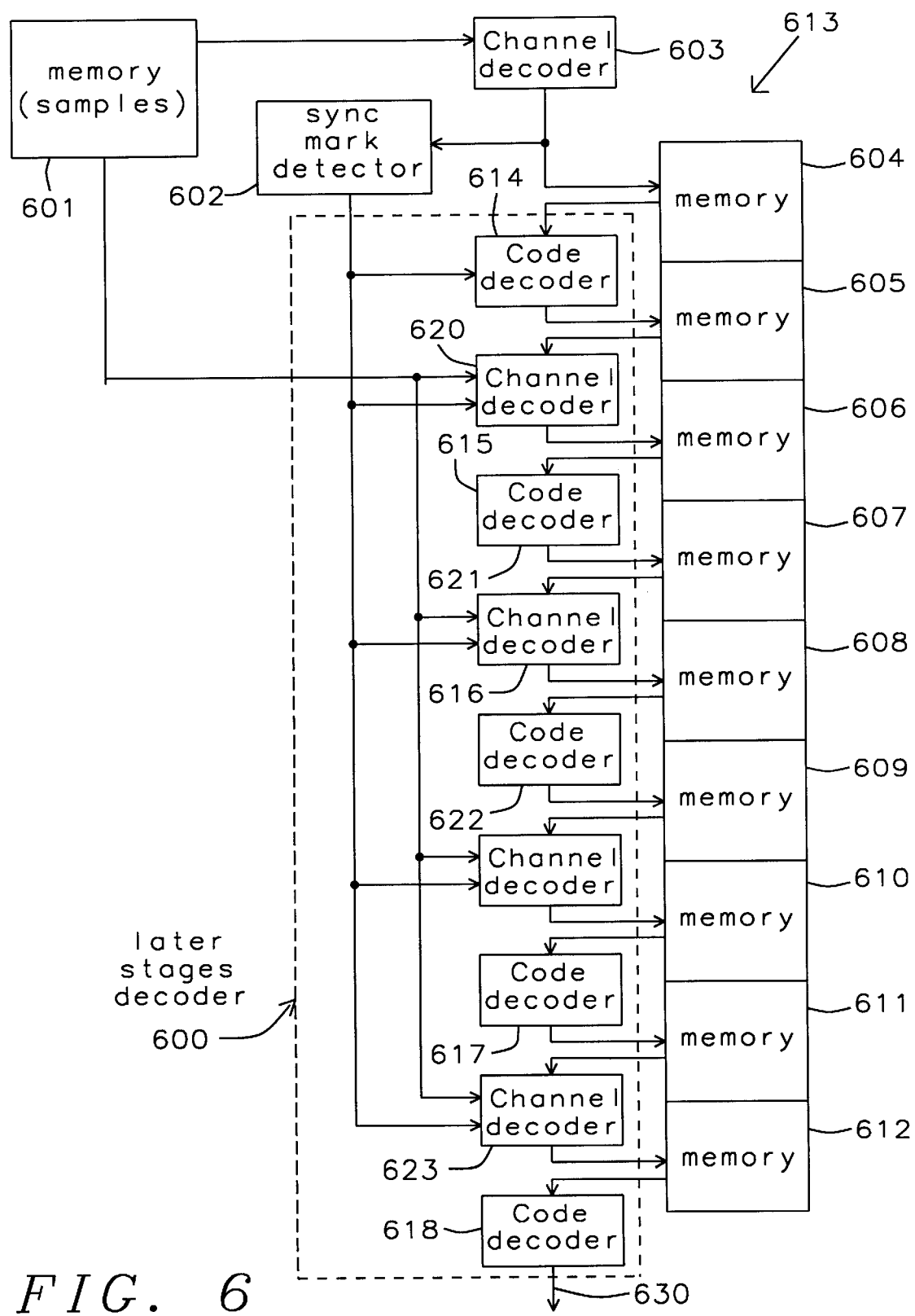
FIG. 6 shows a shows a detailed block diagram of the apparatus of this invention for decoding a bit stream from storage media.

A more detailed description of the data retrieval circuit shown in FIG. 3 will be given with reference to FIGS. 6 and 7. The encoding structure used to encode the data which has been transmitted through a channel or stored on storage media, such as a magnetic disk, and is read by the circuits shown in FIGS. 3 and 6 is shown in FIG. 7. The bit stream-source 704 is sent to a block encoder 700 which produces certain number of parity bits which are then permutted in the interleaver block 701. The parity bits are then inserted in predetermined positions throughout each codeword in block 702. This encoded bit stream is sent to the channel 703. In this diagram the channel 703 represents either a digital data communication channel or a digital data storage channel.

Refer to FIG. 6 for a more detailed view of blocks 301, 302, 303, 304, and 305 of FIG. 3. FIG. 6 shows the implementation diagram of iterative detection with five iterations. The digitized samples outputted by the front end block, reference number 300 in FIG. 3, are stored in a first memory 601, which is shown as a first memory 304 in FIG. 3. They are then sent to a channel decoder 603, which is shown in FIG. 3 as a first stage detector 301. The channel decoder 603 decodes the bits from the digitized samples. This decoder is a channel decoder, in the sense that it decodes both the data and parity bits from the digitized sampled waveform. The structure and the properties of the block code are not taken into account during detection in the channel decoder 603. The output of the channel decoder 603 are not bits but rather the so-called soft information on the bits. The output of the channel decoder 603 in not a 1 or 0 for every bit, b, but the log-likelihood ratio of probabilities which is the logarithm of the probability that b is a 1 divided by the logarithm of the probability that b is a 0. The log-likelihood ratio is given by the equation log P(b=1)/log P(b=0). In this equation P(b=1) is the probability that bit b is a 1 and P(b=0) is the probability the bit b is a 0. Whether a bit, b, is more likely to be a 1 or a 0 is determined by a comparison of the log-likelihood ratio, log P(b=1)/log P(b=0), to 1. These ratios are then stored in a memory sub-block 604. The memory sub-block 604, along with memory sub-blocks 606–612, is a part of a second memory 613. The second memory 613, comprising memory sub-blocks 604, 605, 606, 607, 608, 609, 610, 611, and 612, is shown in FIG. 3 as the second memory 305. While performing this stage of detection, no synchronization information is needed since the channel detection is performed without knowledge of the block code structure.

The output of channel decoder 603 is sent to the synchronization mark detector 602. The synchronization mark detector 602 is shown in FIG. 3 as the synchronization detector 302. There the log-likelihood ratios are compared with 1 in order to obtain preliminary decisions on the bits. The string of these decisions is compared with the preselected synchronization mark pattern in order to determine at what location the string of bits matches the pattern. Once the location of the match is found the synchronization information of the bit stream is known. More specifically the location of the first bit in the sector of data is known. This detection can be performed for both the first and the second synchronization marks so that if the first synchronization mark is not found then the synchronization mark detector 602 searches for the second synchronization mark in the same fashion. This prevents loss of the data if there is a problem with the first or second synchronization mark. If there is a problem with the first synchronization mark the synchronization information from the second synchronization mark can be used.

Once the synchronization information is determined it is fed into a code decoder 614 in order to perform the code detection. The code decoders 614, 615, 616, 617, and 618 and the channel decoders 620, 621, 622, and 623 are all part of a later stages decoder 600, shown by the dashed line in FIG. 6. The later stages decoder 600 shown in FIG. 6 is shown in FIG. 3 as a later stages detector 303. In code decoder 614 the ratios stored in memory sub-block 604 and the knowledge of the code structure are used to provide a more accurate values for the log-likelihood ratio log P(b=1)/log P(b=0). The synchronization information is needed at this stage because the locations of parity bits in the codeword are required. The synchronization information is not required for subsequent code decoders 615, 616, 617, and 618. After the code decoding in the code decoder 614 is performed more precise values of the log-likelihood ratios are stored in memory sub-block 605. This completes the first iteration of iterative decoding.

As previously indicated, the memory sub-blocks 604–612 are part of a second memory 613, which is shown in FIG. 3 as a second memory 305. The second memory, reference number 305 in FIG. 3 and reference number 613 in FIG. 6, stores the results of the iterative decoding.

Note that the order in which the soft information on bits is written in memory blocks 604–612 of the second memory 613 is not the same order in which it is subsequently retrieved since the parity bits were interleaved, by the interleaver 701 shown in FIG. 7, after the block encoder 700, see FIG. 7, and prior to entering the channel 703, see FIG. 7.

Completion of the decoding in the code decoder 614 completes the first iteration of iterative decoding. The soft information stored in memory sub-block 605 could be converted into hard information of 0's and 1's instead of the log-likelihood ratios and sent to the output, reference number 316 in FIG. 3. To improve the accuracy of the log-likelihood ratios, however, the iterative process is repeated a number of times. In the example described herein and shown in FIG. 6 the iterative process is repeated an additional four times for a total of five iterations.

During the second iteration channel decoding is performed in the channel decoder 620. This channel decoding requires data from the digitized samples stored in the first memory 601 and the previously computed log-likelihood ratios stored in the memory sub-block 605. Synchronization information is not required for log-likelihood ratios stored in memory sub-block 605 since they were computed with that information available and were written into the memory in the predetermined order. However synchronization information for the digitized samples retrieved from the first memory 601 is required and this synchronization information is supplied by the synchronization mark detector 602. Once the more precise values-of the log-likelihood ratios are computed they are stored in memory sub-block 606 and then retrieved in a different order by the code decoder 615 in order to perform code decoding. After the code decoding in the code decoder 615 has been completed more precise values of the log-likelihood ratios are stored in memory sub-block 607. Completion of the code decoding in the code decoder 615 completes the second iteration.

During the third iteration channel decoding is performed in the channel decoder 621. This channel decoding requires data from the digitized samples stored in the first memory 601 and the previously computed log-likelihood ratios stored in the memory sub-block 607. Synchronization information is not required for log-likelihood ratios stored in memory sub-block 607 since they were computed with that information available and were written into the memory in the predetermined order. However synchronization information for the digitized samples retrieved from the first memory 601 is required and this synchronization information is supplied by the synchronization mark detector 602. Once the more precise values of the log-likelihood ratios are computed they are stored in memory sub-block 608 and then retrieved in a different order by the code decoder 616 in order to perform code decoding. After the code decoding in the code decoder 616 has been completed more precise values of the log-likelihood ratios are stored in memory sub-block 609. Completion of the code decoding in the code decoder 616 completes the third iteration.

During the fourth iteration channel decoding is performed in the channel decoder 622. This channel decoding requires data from the digitized samples stored in the first memory 601 and the previously computed log-likelihood ratios stored in the memory sub-block 609. Synchronization information is not required for log-likelihood ratios stored in memory sub-block 609 since they were computed with that information available and were written into the memory in the predetermined order. However synchronization information for the digitized samples retrieved from the first memory 601 is required and this synchronization information is supplied by the synchronization mark detector 602. Once the more precise values of the log-likelihood ratios are computed they are stored in memory sub-block 610 and then retrieved in a different order by the code decoder 617 in order to perform code decoding. After the code decoding in the code decoder 617 has been completed more precise values of the log-likelihood ratios are stored in memory sub-block 611. Completion of the code decoding in the code decoder 617 completes the fourth iteration.

During the fifth iteration channel decoding is performed in the channel decoder 623. This channel decoding requires data from the digitized samples stored in the first memory 601 and the previously computed log-likelihood ratios stored in the memory sub-block 611. Synchronization information is not required for log-likelihood ratios stored in memory sub-block 611 since they were computed with that information available and were written into the memory in the predetermined order. However synchronization information for the digitized samples retrieved from the first memory 601 is required and this synchronization information is supplied by the synchronization mark detector 602. Once the more precise values of the log-likelihood ratios are computed they are stored in memory sub-block 612 and then retrieved in a different order by the code decoder 618 in order to perform code decoding. After the code decoding in the code decoder 618 has been completed the five iterations of this example are complete. The final values of the log-likelihood ratios are then converted into hard information of 0's and 1's and sent to the output 630. The output 630 in FIG. 6 corresponds to the output 336 of the later stages detector 303 in FIG. 3.

Although five iterations have been described in this example those skilled in the art will readily recognize that a greater or smaller number of iterations could be used. More iterations would require more circuitry and fewer iterations would require less circuitry.

A computer program, stored in a medium, can be used to control the decoding of a bit stream from an analog waveform representing the bit stream. The analog waveform has a first synchronization mark, data, and a second synchronization mark. The computer program first provides for converting the analog waveform to digitized samples, performing gain and timing recovery, and digital equalization. The computer program provides for decoding the digitized samples to form a reconstructed bit stream, storing the reconstructed bit stream, extracting at least one of the first synchronization mark and the second synchronization mark from the reconstructed bit stream, and extracting the data from the reconstructed bit stream in accordance with at least one of the first synchronization mark and the second synchronization mark.

The computer program also provides for storing the digitized samples, iterative decoding, decoding data and parity information from the digitized samples, and providing a log-likelihood ratio of probabilities equal to $\log(P(b=1))$ divided by $\log(P(b=0))$, wherein $P(b=1)$ is the probability that bit b is a 1, and wherein $P(b=0)$ is the probability that bit b is a 0.

Figure 8:
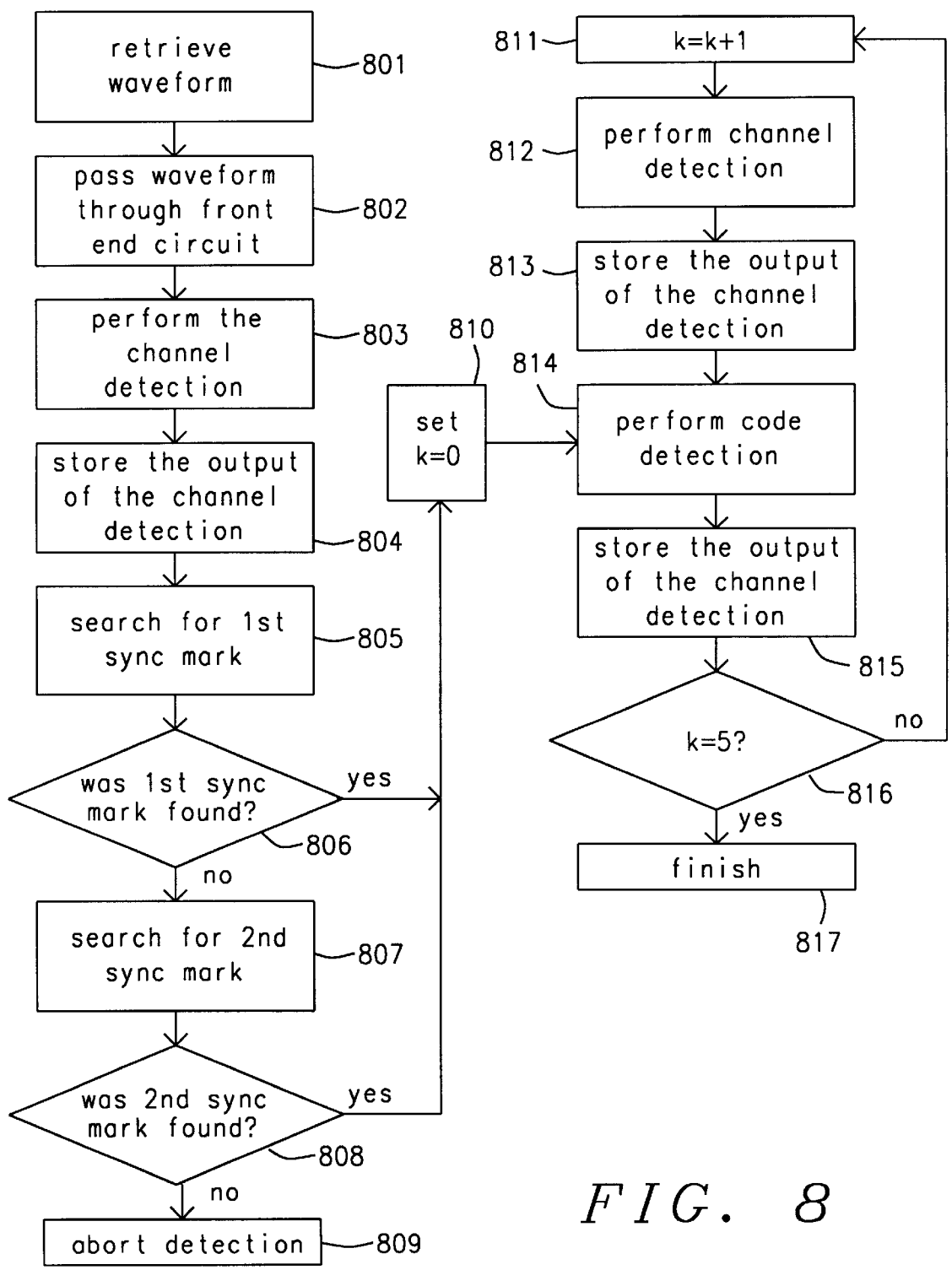
FIG. 8 shows a flow diagram showing the iterative decoding of a bit stream.

A block diagram of the decoding of a bit stream from an analog waveform representing the bit stream is shown in FIG. 8. The waveform is retrieved, block 801, and passed through the front end circuit, block 802. The channel detection is performed, block 803, and output of the channel detection is stored, block 804. A search for the first synchronization mark is then performed, block 805, and if found a counter is set to zero, block 810. If the first synchronization mark is not found a search is performed for the second synchronization mark, block 807, and if the second synchronization mark is found the counter is set to zero, block 810. If neither the first synchronization mark nor the second synchronization mark are found the detection must be terminated, block 809.

After the counter has been set to zero, block 810, a code detection is performed, block 814, the output of the code detection is stored, block 815, and if the counter is less than five the counter is incremented by one, block 811. A channel detection is then performed, block 812, the output of the channel detection is stored, block 813, code detection is again performed, block 814, the output of the code detection is stored, block 815, and the counter is again compared to five, block 816. If the counter is less than five the operations in block 811 through block 816 are again performed until the counter becomes equal to five and the iterative decoding is completed, block 817.

While the invention has been described in conjunction with several specific embodiments, it is evident to those skilled in the art that many further alternatives, modifications and variations will be apparent in light of the foregoing description. More specifically, while the decoder of the present invention is implemented as an integrated circuit, it is contemplated that the present invention may also be implemented as discrete components or a general-purpose processor operated in accordance with program code instructions or computer program or combination thereof. These program code instructions can be obtain from a medium, such as network, local area network, the Internet, or storage devices. Such storage devices include, by way of example, magnetic storage devices, optical storage devices, electronic storage devices, magneto-optical device and the like. Moreover, as will be appreciated by one of ordinary skill in the art, while a number of examples have shown being utilized with mass storage systems, the same encoder and decoder circuits and methods may also be utilized with data transmission systems. As such, apparatuses and techniques discussed with the preferred embodiments are just as applicable with data transmissions systems. Thus, the invention described herein is intended to embrace all such alternatives, modifications, applications and variations as may fall within the spirit and scope of the appended claims.

What is claimed is:

1. An apparatus for decoding a bit stream from an analog waveform representing the bit stream, having a first synchronization mark, data, and a second synchronization mark, the apparatus comprising:

converting means for converting the analog waveform to digitized samples;

decoding means for decoding the digitized samples from said converting means to form a reconstructed bit stream;

storing means for storing the reconstructed bit stream from said decoding means;

synchronization extracting means for extracting at least one of the first synchronization mark and the second synchronization mark from the reconstructed bit stream from said decoding means; and data extracting means for extracting the data from the reconstructed bit stream in accordance with at least one of the first synchronization mark and the second synchronization mark extracted by said synchronization extracting means, wherein the data extracting means includes an iterative decoder.

2. An apparatus according to claim 1, further comprising storing means for storing the digitized samples from said converting means.

3. An apparatus according to claim 1, wherein said data extracting means performs the data extraction iteratively.

4. An apparatus according to claim 1, wherein said converting means performs gain and timing recovery and digital equalization.

5. An apparatus according to claim 1, wherein said decoding means decodes data and parity information from the digitized samples.

6. An apparatus according to claim 1, wherein said decoding means provides a log-likelihood ratio of probabilities equal to log (P(b=1)) divided by log (P(b=0)), wherein P(b=1) is the probability that bit b is a 1, and wherein P(b=0) is the probability that bit b is a 0.

7. An apparatus for decoding a bit stream from an analog waveform representing the bit stream, having a first synchronization mark, data, and a second synchronization mark, the apparatus comprising:

an analog to digital converter to convert the analog waveform to digitized samples;

a decoder in communication with said analog to digital converter to decode the digitized samples into a reconstructed bit stream;

a first memory in communication with said decoder to store the reconstructed bit stream;

a synchronization extractor in communication with said first memory to extract at least one of the first synchronization mark and the second synchronization mark from the reconstructed bit stream; and a data extractor in communication with said synchronization extractor to extract the data from the reconstructed bit stream in accordance with at least one of the first synchronization mark and the second synchronization mark, wherein the data extractor is an iterative decoder.

8. An apparatus according to claim 7, further comprising a second memory in communication with said analog to digital converter to store the digitized samples.

9. An apparatus according to claim 7, wherein said data extractor performs the data extraction iteratively.

10. An apparatus according to claim 7, wherein said analog to digital converter comprises gain and timing recovery and digital equalization circuits.

11. An apparatus according to claim 7, wherein said decoder decodes data and parity information from the digitized samples.

12. An apparatus according to claim 7, wherein said decoder provides a log-likelihood ratio of probabilities equal to log (P(b=1)) divided by log (P(b=0)), wherein P(b=1) is the probability that bit b is a 1, and wherein P(b=0) is the probability that bit b is a 0.

* * * * *